Patented Nov. 30, 1926.

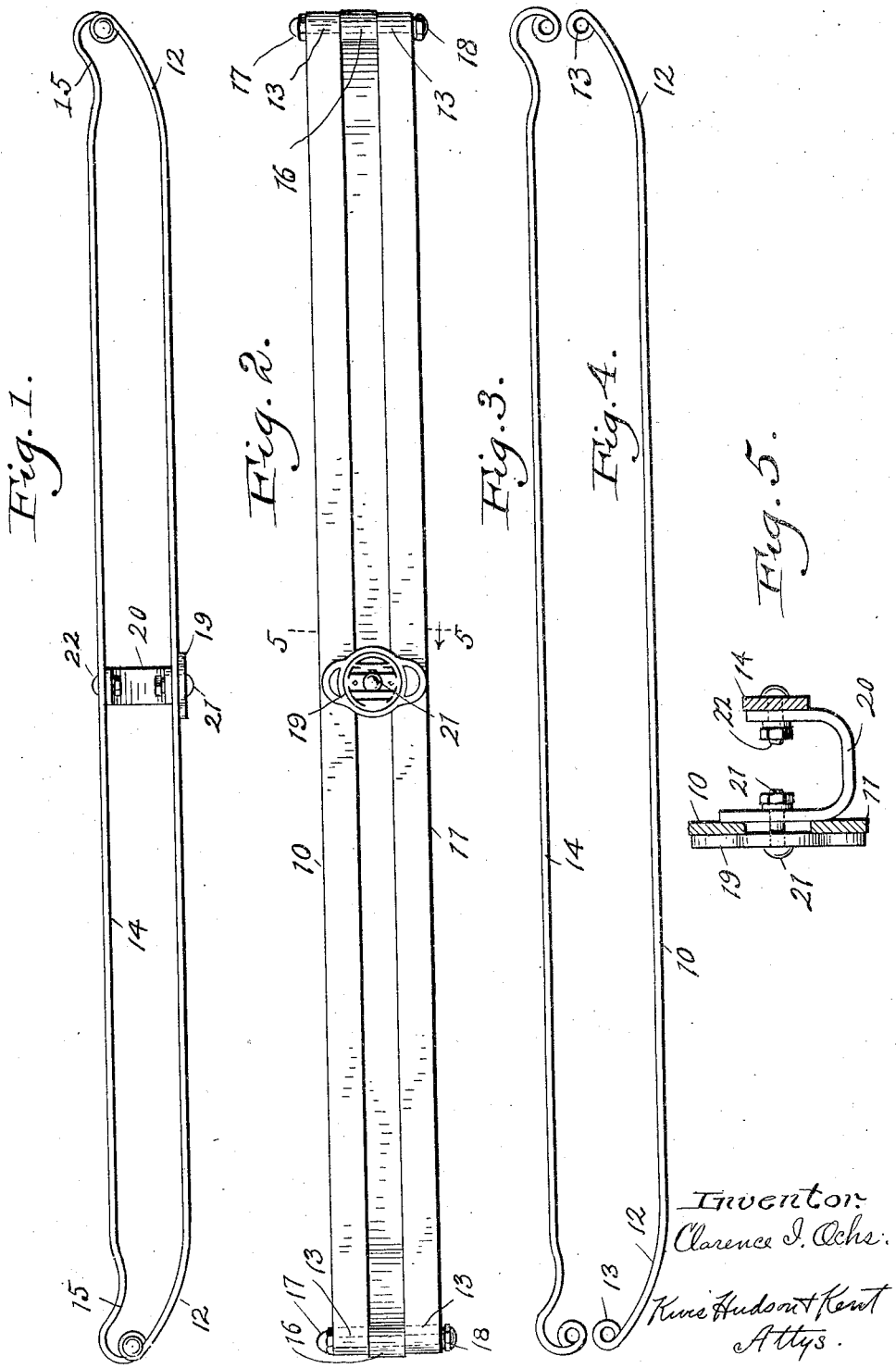

1,609,037

UNITED STATES PATENT OFFICE.

CLARENCE I. OCHS, OF CLEVELAND, OHIO, ASSIGNOR TO THE EATON AXLE & SPRING COMPANY, OF CLEVELAND, OHIO, A CORPORATION OF OHIO.

FENDER GUARD.

Application filed March 22, 1926. Serial No. 96,377.

This invention relates to bumpers for automobiles and has for one of its objects the provision of a bumper of very simple construction, that will consist of few parts and be adapted for economical production and also have the requisite strength to withstand the shocks to which bumpers are normally subjected in service. A further object is to provide a bumper comprising bars that are pivotally connected together at their ends and so shaped as to be adapted to ward off bumpers and other objects and minimize the tendency to hook or interlock with the same from the rear.

Other objects of the invention and the features of novelty will be apparent from the following description taken in connection with the accompanying drawing, of which: Fig. 1 is a plan view of a bumper embodying my invention; Fig. 2 is a front elevation thereof; Fig. 3 is a plan view of the rear bar; Fig. 4 is a plan view of one of the front or impact bars and Fig. 5 is an enlarged section on the line 5—5 of Fig. 2.

Referring to the drawings, 10 and 11 indicate two vertically spaced front or impact bars which are identical in construction and have their end portions curved rearwardly, as indicated at 12, and provided with eyes 13. A rear bar 14, which is substantially straight throughout the major portion of its length, has its end portions bent to the rear and in substantial parallelism with the end portions 12 of the impact bars, as indicated at 15. The extreme end portions of the rear bar are then bent forwardly and provided with eyes 16 which are arranged between the eyes 13 of the bars 10 and 11. The eyes at the ends of the bumper are connected together by pins 17 and these pins preferably have their lower ends threaded to receive the securing nuts 18.

A plate 19 is arranged on the front of the bars 10 and 11, at the middle thereof, and a U-shaped member 20 engages the rear sides of the bars 10 and 11, the bars being clamped between the plate 19 and the member 20 by means of the bolt 21. The member 20 is also secured to the rear bar 14 by means of the bolt or rivet 22 so that the middle portions of the impact bars and the rear bar are securely clamped together by means of the member 20.

A bumper constructed, as illustrated and described, is adapted for economical production because of the simplicity of the bars 10, 11 and 14, and also because the bars 10 and 11 are identical in shape and size. The bumper also has the advantage of unusual strength because of the reinforcement of the impact bars by the connection 20 with the rear bar and also because of the hinge-like connections at the end of the bumper.

The usual tendency of bumpers, having bars pivoted together at the ends of the bumper, to hook or interlock with bumpers on other cars, or with other objects, is minimized by having the ends of the rear bar well-rounded and extended somewhat beyond the eyes so as to be capable of warding off other bumpers and objects which meet the ends of the bumper from the rear thereof.

Having thus described my invention, I claim:

1. In bumpers, the combination of two vertically spaced impact bars arranged in vertical alignment and having their end portions rearwardly curved and provided with eyes, a rear bar having eyes in its ends positioned between the eyes of said impact bars, the end portions of said rear bar being curved outwardly and rearwardly from said eyes and then forwardly in substantially parallel relation to the adjacent end portions of said impact bars, and pins connecting the eyes of said bars.

2. In bumpers, the combination of two vertically spaced impact bars arranged in vertical alignment and having their end portions rearwardly curved and provided with eyes, a rear bar having eyes in its ends positioned between the eyes of said impact bars, the end portions of said rear bar being curved outwardly and rearwardly from said eyes and then forwardly in substantially parallel relation to the adjacent end portions of said impact bars, pins connecting the eyes of said bars, and means for securing said impact bars together at the middle of the bumper and connecting them with the middle of said rear bar.

In testimony whereof, I hereunto affix my signature.

CLARENCE I. OCHS.